(12) United States Patent
Bigolin

(10) Patent No.: US 6,860,552 B1
(45) Date of Patent: Mar. 1, 2005

(54) BICYCLE SADDLE

(76) Inventor: Giuseppe Bigolin, Zona Industriale Mottinello, Via Prima Strada, 15, 36028 Rossano Veneto (Vicenza) (IT)

( * ) Notice: Subject to any disclaimer, the term of this patent is extended or adjusted under 35 U.S.C. 154(b) by 0 days.

(21) Appl. No.: 10/258,926

(22) PCT Filed: Oct. 12, 2000

(86) PCT No.: PCT/IT00/00407

§ 371 (c)(1),
(2), (4) Date: Oct. 28, 2002

(87) PCT Pub. No.: WO01/83286

PCT Pub. Date: Nov. 8, 2001

(30) Foreign Application Priority Data

Apr. 28, 2000 (IT) ...................................... MI2000A0945

(51) Int. Cl.[7] .............................. B62J 1/26; A47C 7/14
(52) U.S. Cl. ...................... 297/214; 297/199; 297/200; 297/452.41; 297/DIG. 3
(58) Field of Search ............................ 297/214, 452.41, 297/DIG. 3, 199, 200

(56) References Cited

U.S. PATENT DOCUMENTS

| | | | | |
|---|---|---|---|---|
| 3,758,154 A | * | 9/1973 | Kitagachi | 297/214 |
| 3,807,793 A | * | 4/1974 | Jacobs | 297/214 |
| 3,997,214 A | * | 12/1976 | Jacobs | 297/214 |
| 5,121,962 A | * | 6/1992 | Weber et al. | 297/199 X |
| 5,147,685 A | * | 9/1992 | Hanson | 297/214 X |
| 5,244,251 A | * | 9/1993 | Bourla | 297/199 |
| 5,286,082 A | * | 2/1994 | Hanson | 297/199 X |
| 5,670,232 A | * | 9/1997 | Bigolin | 297/199 |
| 5,671,977 A | * | 9/1997 | Jay et al. | 297/452.41 X |
| 5,720,518 A | * | 2/1998 | Harrison | 297/214 |
| 5,738,406 A | * | 4/1998 | Deus | 297/200 |
| 5,791,730 A | * | 8/1998 | Hoffacker | 297/214 X |
| 5,904,396 A | * | 5/1999 | Yates | 297/214 |
| 6,012,772 A | * | 1/2000 | Conde et al. | 297/199 X |
| 6,030,035 A | * | 2/2000 | Yates | 297/214 |
| 6,135,550 A | * | 10/2000 | Tucho | 297/199 |
| 6,390,548 B1 | * | 5/2002 | Cole | 2997/199 |

FOREIGN PATENT DOCUMENTS

DE 4005565 A1 * 8/1991 ............. 297/199

* cited by examiner

Primary Examiner—Rodney B. White
(74) Attorney, Agent, or Firm—Hedman & Costigan, P.C.

(57) ABSTRACT

A saddle, specifically designed for bicycles, comprises a framework (2) to be coupled to a supporting element and a padding element (3), thereon a user will seat, the saddle being characterized in that it comprises a cushion element (4), including at least a fluid-filled deformable vessel.

2 Claims, 6 Drawing Sheets

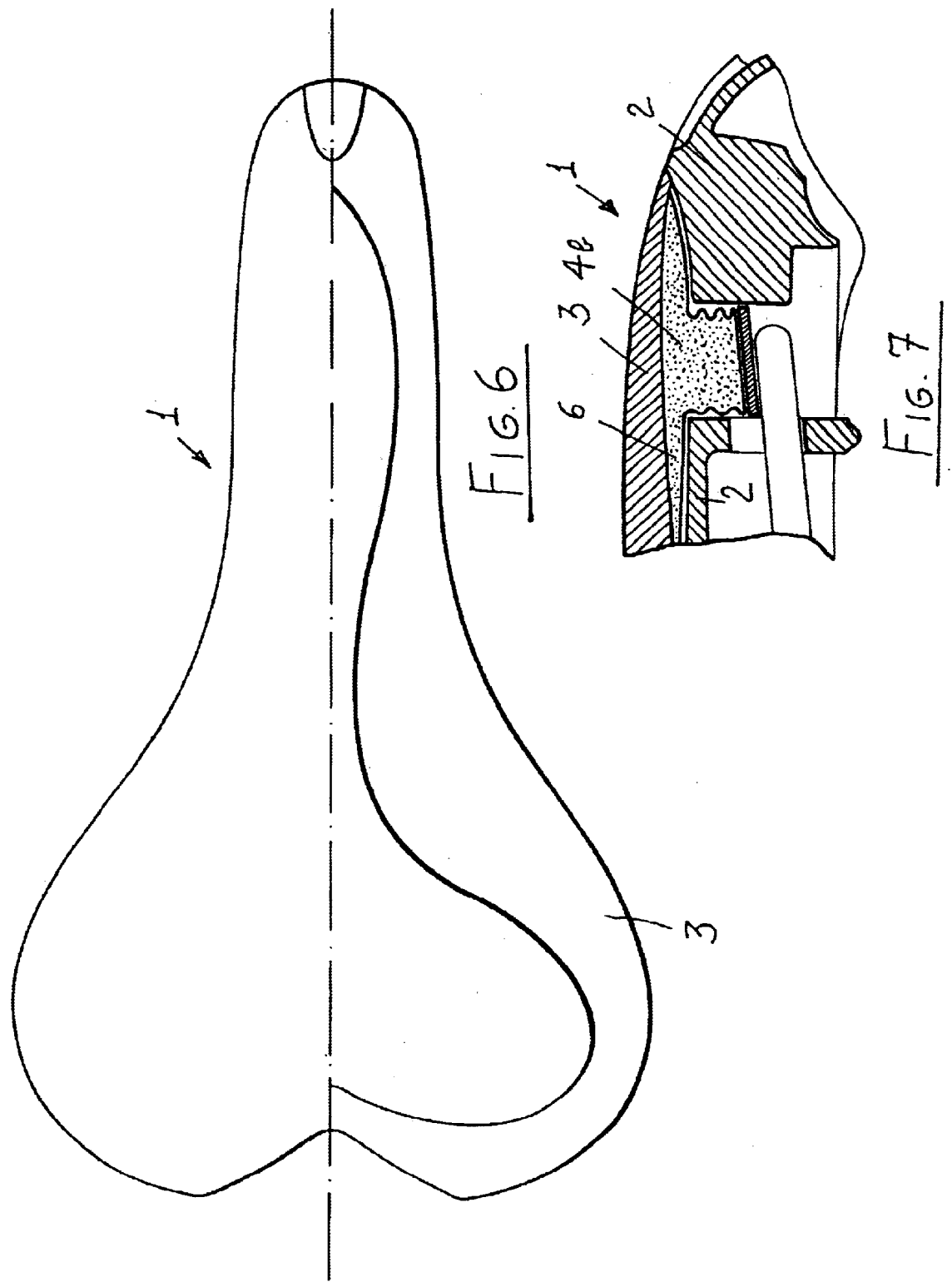

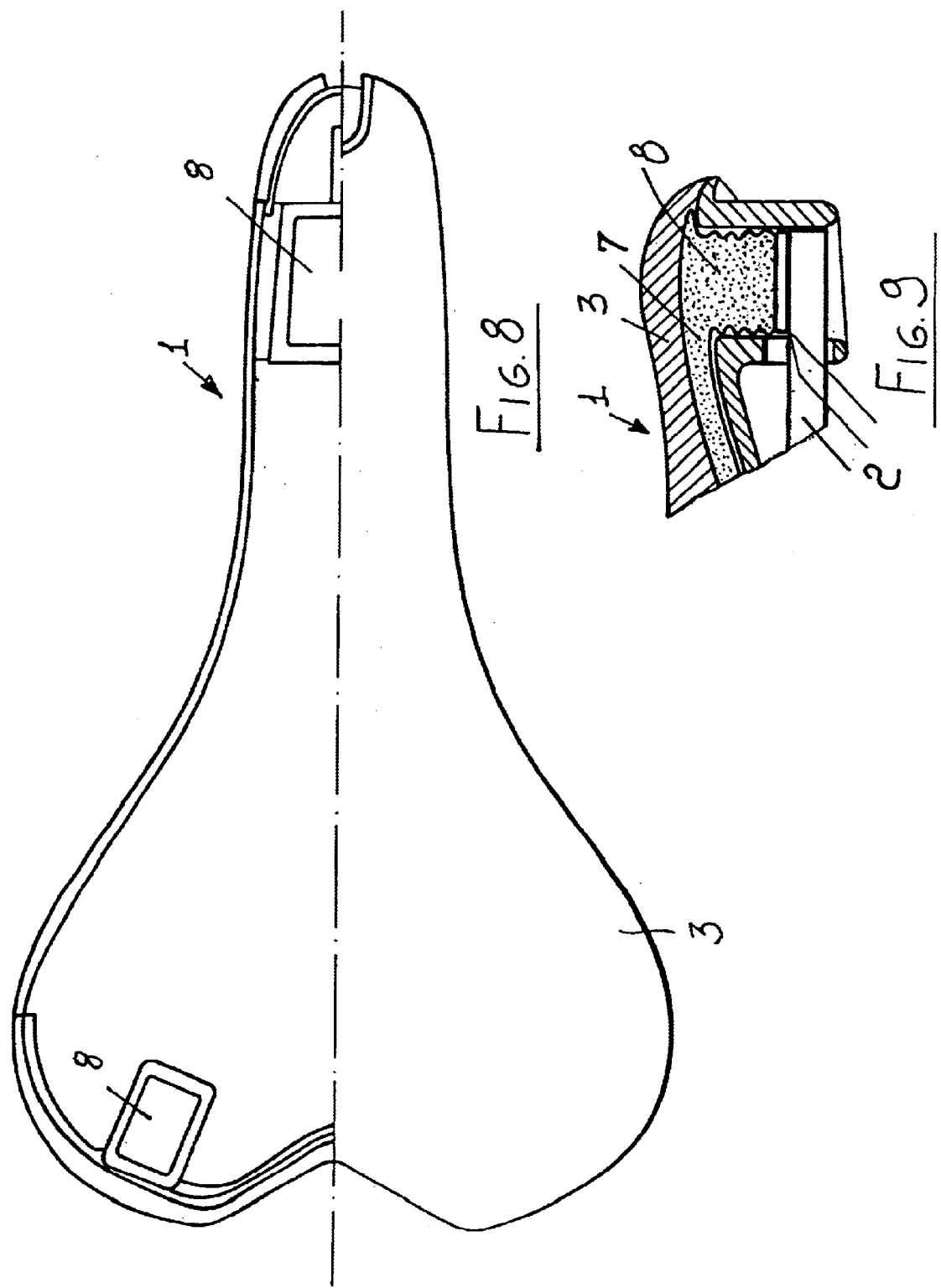

BICYCLE SADDLE

BACKGROUND OF THE INVENTION

The present invention relates to a saddle construction, specifically designed for bicycles.

As is known, a bicycle saddle must have a construction which is both rigid, in order to resist against the forces applied thereon, and resilient, to absorb stresses caused by the road mantle.

Thus, such a saddle must be rigid at those points at which the force transmitted by the ischiatic bone of the user can be easily balanced by a bearing resisting against the applied force, but it, on the other hand, must be soft, in order to provide the cyclist with a comfort as great as possible.

Another problem in designing bicycle saddles is that of providing a proper distributing of the bearing points, from an anatomic standpoint.

SUMMARY OF THE INVENTION

Accordingly, the aim of the present invention is to provide such a bicycle saddle which is greatly improved with respect to prior bicycle saddles.

Within the scope of the above mentioned aim, a main object of the invention is to provide such a saddle construction adapted to assure a very good stability and dampening level.

Another object of the present invention is to provide such a saddle construction which is much more comfortable, the technical features thereof being the same, than prior like saddles.

According to one aspect of the present invention, the above mentioned aim and objects, as well as yet other objects, which will become more apparent hereinafter, are achieved by a saddle construction, specifically designed for bicycles, comprising a saddle framework to be coupled to a supporting element and a padding element, thereon a user will seat, characterized in that said saddle construction comprises a cushion elements, including at least a fluid-filled deformable vessel, operating as a hydraulic cushion on the top portion and has a hydromechanical damper at several points of the bottom portion thereof, and provided for contacting the saddle framework.

BRIEF DESCRIPTION OF THE DRAWINGS

Further characteristics and advantages of the saddle construction according to the present invention will become more apparent hereinafter from the following detailed disclosure of a preferred, though not exclusive, embodiment of the invention, which is illustrated, by way of an indicative, but not limitative, example, in the accompanying drawings, where:

FIG. 6 illustrates a top view of a saddle construction according to the present invention and specifically showing the anatomic characteristics thereof;

FIG. 7 illustrates a further cross-sectioned side view of the front portion of the saddle construction according to the invention;

FIG. 8 illustrates a further top view, as partially cross-sectioned, of that same saddle construction; and FIG. 9 illustrates a further cross-sectioned side view, of a detail of the saddle construction according to the invention.

DESCRIPTION OF THE PREFERRED EMBODIMENTS

Figure 1:
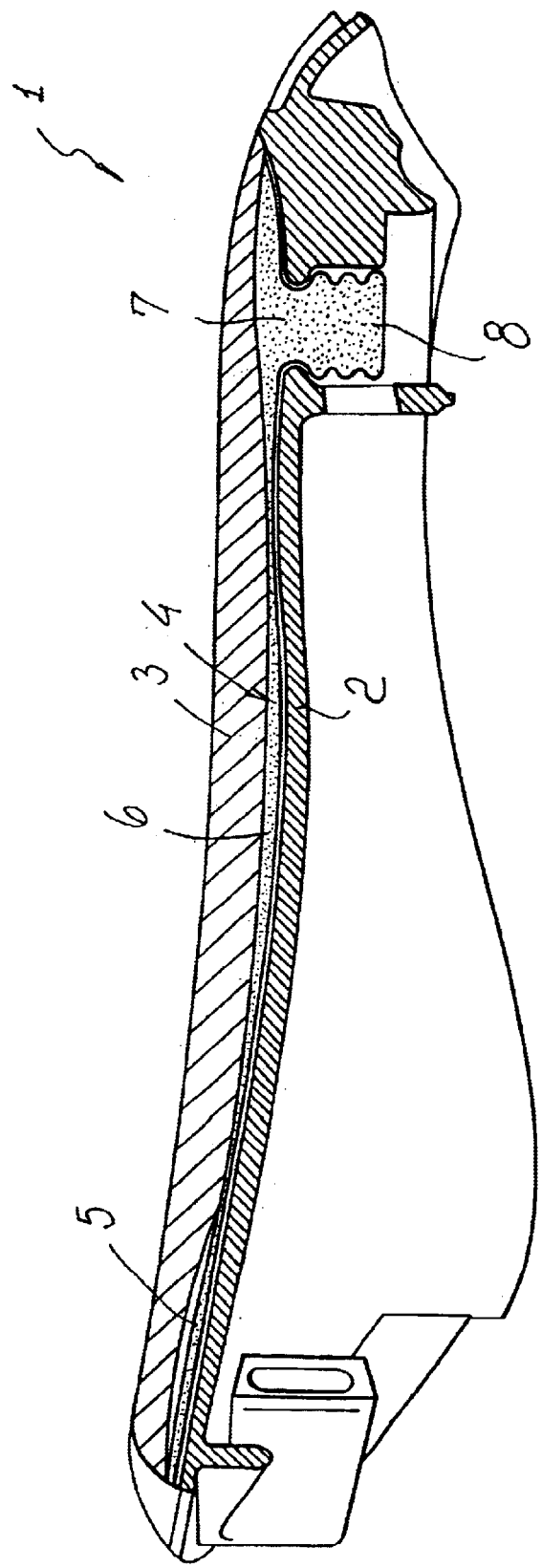
FIG. 1 is a side cross sectional view illustrating the saddle construction according to the invention.
Figure 2:
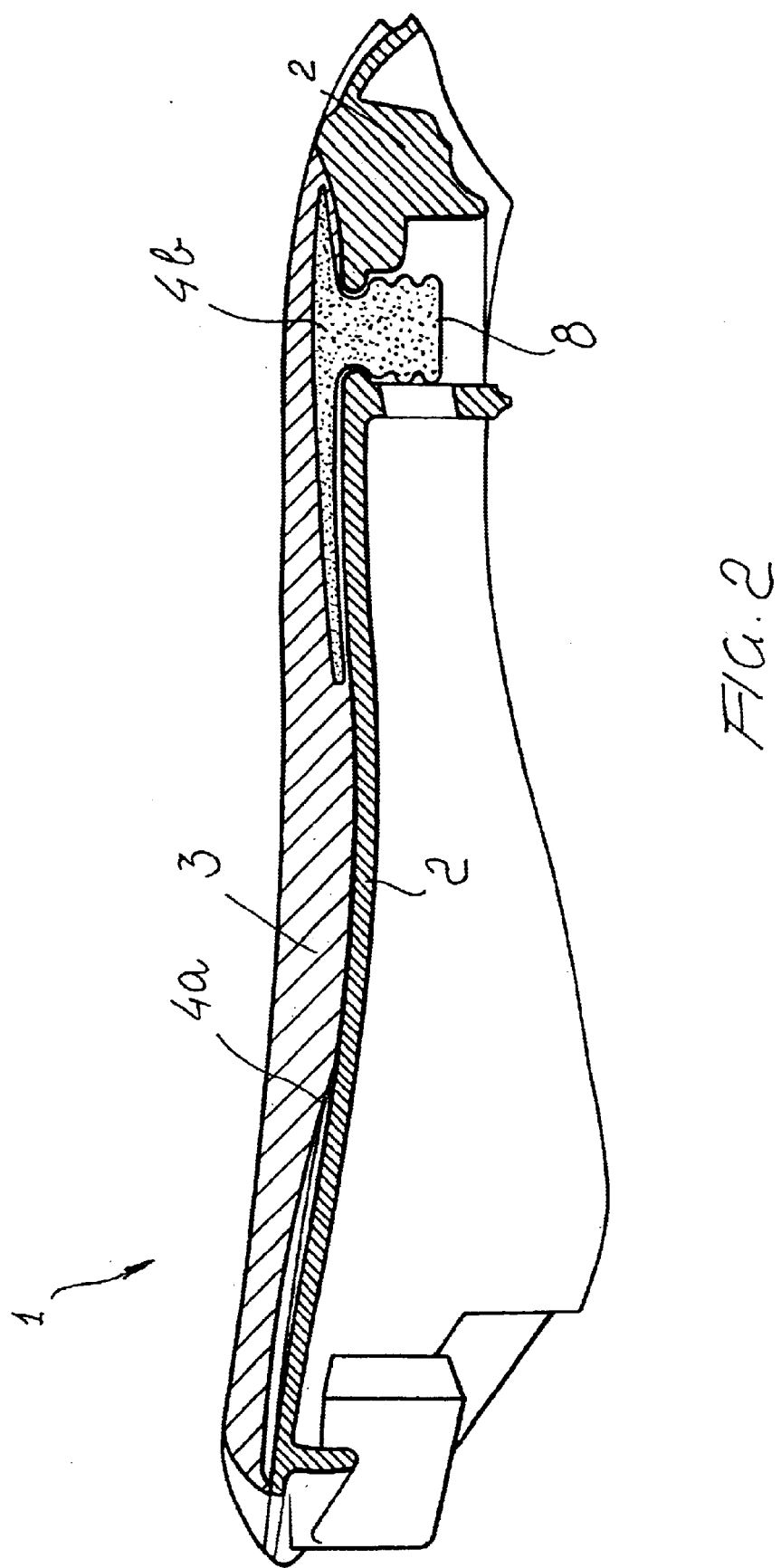
FIG. 2 is a further side cross-sectional view illustrating the same saddle construction, with a different arrangement of the cushion element.
Figure 3:
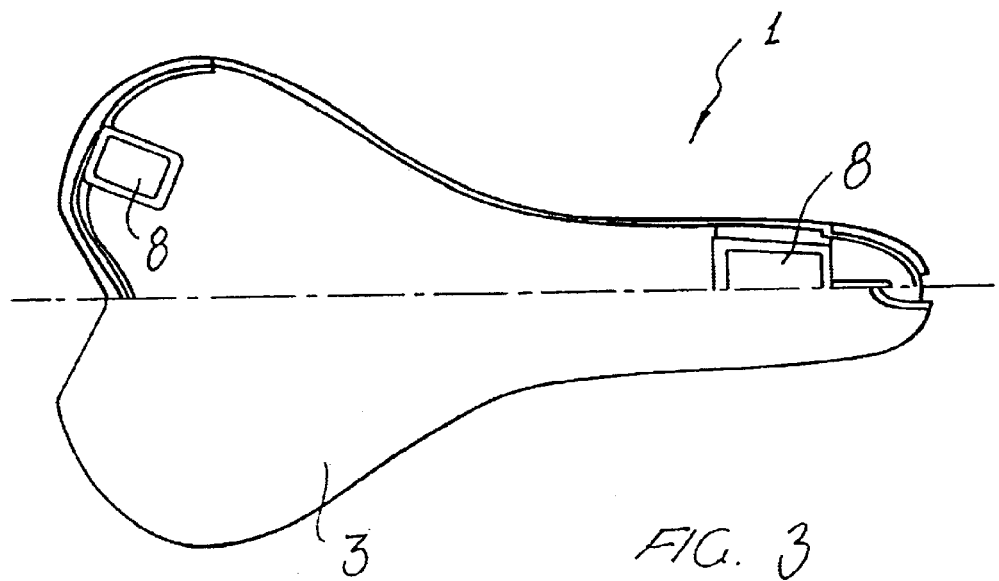
FIG. 3 is a top plan view, partially broken away, of the saddle construction, and specifically illustrates a possible arrangement of a preferred bellows device.
Figure 4:
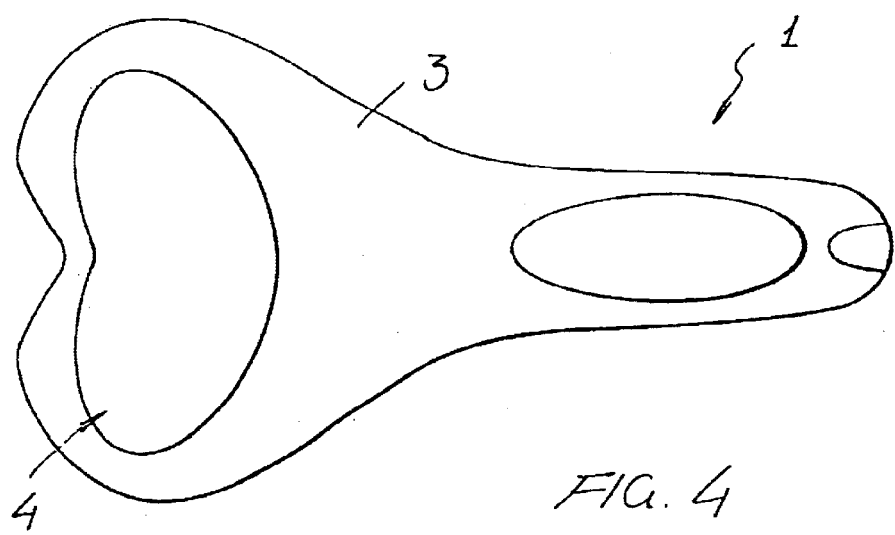
FIG. 4 is a further top plan view, partially broken away, of the saddle construction according to the invention, and specifically illustrating a possible arrangement of the cushion element.
Figure 5:
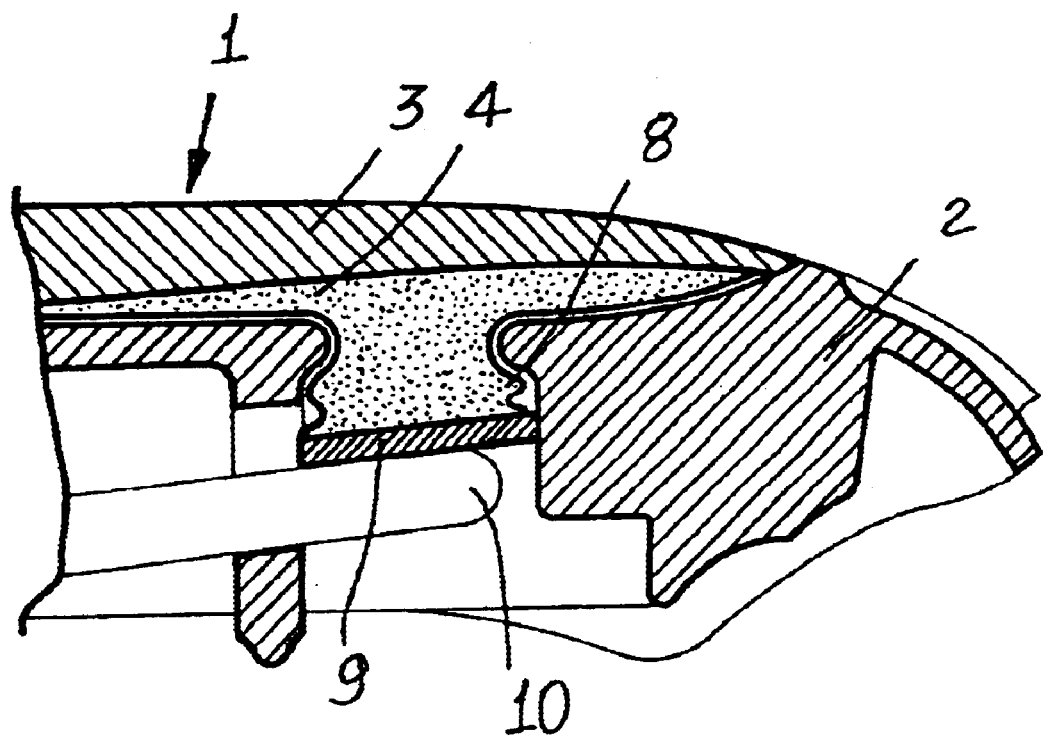
FIG. 5 is a side cross-sectional view illustrating the bellows construction which can either contact or not an elastomeric element which, by contacting the saddle framework, can aid the bellows operation of the cushion, thereby affording the possibility of either including or not an elastomeric element or material.

With reference to the number references of the accompanying figures, the saddle construction according to the invention, which has been generally indicated by the reference number 1, comprises a saddle framework 2, which can be coupled to a supporting element, conventionally comprising a pipe coupled to a bicycle frame, in a per se known manner and not specifically shown, as well as a padding element 3, thereon the bicycle user will seat.

The framework 2 can be for example made of a composite material, and the padding 3 can be, for example, made of a polyurethane material, or comprise a fluid cushion, operating as a padding proper.

According to the invention, the saddle framework comprises a cushion element 4, including at least a fluid-filled deformable vessel, and arranged between the framework and padding.

Advantageously, the cushion element may have a variable thickness, for example at the rear regions 5, at the central region 6 and at the frontal region 7, as is shown in FIG. 1.

The cushion element forming vessel is advantageously provided with a greater thickness at the regions thereof corresponding to the ischiatic region of the user, and to the prostatic region of said user.

Such a density distribution allows a greater comfort for the user, with respect to the top portion contacting the user body, while assuring a mechanical absorption of the stresses deriving from the road mantle, which stresses are cushioned and absorbed by the bottom portion of the cushion, arranged in the saddle framework, and providing a hydromechanical type of action, owing to its specifically designed configuration, which can also be a bellows configuration.

Actually, the saddle construction is rigid at the ischiatic bone region, where the force transmitted therein is counterbalanced by a soft bearing, and suitably resisting against the applied forces.

Advantageously, a preferred embodiment of the saddle comprises the cushion element including one or more vessels which can also hold therein different density fluids.

The cushion element 4, in particular, can comprise a plurality of elements including bellows projections 8, engaged in recesses formed in the saddle framework.

In this connection it should be pointed out that the cushion element forming vessels can be coupled by coupling channels, adapted to allow fluids to pass from a vessel to another vessel.

The mentioned vessels, as it should be apparent, can be provided in any desired number, according to the contingent requirements, and can be either coupled or not by fluid channels.

The used fluid can have a greater density or viscosity at the ischiatic regions and a less viscosity or density at the prostatic region, according to the needs.

Thus, from the above disclosure it should be apparent that the invention fully achieves the intended aim and objects.

Actually, a saddle construction specifically designed for bicycles and the like has been provided, which is adapted to assure a proper transmission of the applied forces while providing the user with a very good comfort.

In practicing the invention, the used materials, as well as the contingent sizes and shapes, can be any, according to requirements.

What is claimed is:

1. A saddle construction for bicycles, comprising a saddle framework, to be coupled to a supporting element and a padding element, thereon a bicycle user will sit, and a cushion element, including at least a deformable vessel filled with a fluid, wherein said cushion element has a rear region, a central region and a front region of different thicknesses with a greater thickness at regions thereof corresponding to an ischiatic region and a prostatic region of a bicycle user, said cushion element comprising a plurality of cushioning region, engaged in corresponding engagement recesses formed in said saddle framework, for engaging therein elastomeric force absorbing cushioning means, said cushioning regions comprising bellows elements.

2. A saddle construction for bicycles, comprising a saddle framework, to be coupled to a supporting element and a padding element, thereon a bicycle user will sit, and a cushion element, including deformable vessel means filled with a fluid, said cushion element having a rear region, a central region and a front region of different thicknesses with a greater thickness at regions thereof corresponding to an ischiatic region and a prostatic region of a bicycle user, said fluid having a greater viscosity at said ischiatic region and a less viscosity at said prostatic region, said deformable vessel means including a plurality of vessels coupled by coupling channels for allowing said fluid to pass from a vessel to another vessel, said cushion element further comprising a plurality of cushioning regions engaged in corresponding engagement recesses formed in said saddle framework, for engaging therein elastomeric force absorbing cushioning means, wherein said cushioning regions comprise bellows elements.

\* \* \* \* \*